United States Patent
Crow et al.

(10) Patent No.: US 9,622,411 B2
(45) Date of Patent: Apr. 18, 2017

(54) LOCKOUT FASTENER FOR A GATHERING CHAIN ASSEMBLY OF AN AGRICULTURAL HARVESTER ROW UNIT

(71) Applicant: CNH Industrial America LLC, New Holland, PA (US)

(72) Inventors: Brian Patrick Crow, Rock Island, IL (US); Felipe Baldissera Ramina, Curitiba (BR)

(73) Assignee: CNH Industrial America LLC, New Holland, PA (US)

( * ) Notice: Subject to any disclaimer, the term of this patent is extended or adjusted under 35 U.S.C. 154(b) by 23 days.

(21) Appl. No.: 14/852,068

(22) Filed: Sep. 11, 2015

(65) Prior Publication Data

US 2017/0071128 A1 Mar. 16, 2017

(51) Int. Cl.
*A01D 45/02* (2006.01)
*A01D 61/00* (2006.01)

(52) U.S. Cl.
CPC .......... *A01D 45/023* (2013.01); *A01D 61/006* (2013.01)

(58) Field of Classification Search
CPC ...... A01D 45/00; A01D 45/02; A01D 45/023; A01D 45/025; A01D 45/021; A01D 61/006; F16H 7/10; F16H 7/14; F16H 7/1263
USPC ........ 56/82, 75, 35, 36, 38, 41, 62, 94, 106, 56/119; 180/53; 198/814; 474/101, 115, 474/117, 138, 119
See application file for complete search history.

(56) References Cited

U.S. PATENT DOCUMENTS

| | | |
|---|---|---|
| 829,091 A | 8/1906 | Stone |
| 2,413,265 A | 12/1946 | Thompson |
| 2,612,988 A | 10/1952 | Andrews |
| 3,759,021 A | 9/1973 | Schreiner et al. |
| 3,808,783 A | 5/1974 | Sutherland et al. |
| 3,921,793 A | 11/1975 | Hutchinson et al. |
| 4,803,804 A | 2/1989 | Bryant |
| 5,195,309 A | 3/1993 | Mossman |
| 5,878,561 A * | 3/1999 | Gunn .................. A01D 45/023 56/119 |
| 6,226,969 B1 * | 5/2001 | Becker ................ A01D 45/021 56/62 |
| 6,398,681 B1 | 6/2002 | Wanie |

(Continued)

FOREIGN PATENT DOCUMENTS

DE 102004061112 A1 6/2006

*Primary Examiner* — Robert Pezzuto
(74) *Attorney, Agent, or Firm* — Patrick M. Sheldrake

(57) ABSTRACT

A row unit of a header for an agricultural harvester having a gathering chain lockout assembly is provided. The row unit includes a frame, a gathering chain assembly and a lockout assembly that allows adjustment or removal of the gathering chain. The gathering chain assembly is mounted to the frame extending forwardly of the header and includes first and second sprockets, an endless chain extending between the first and second sprockets, and a carriage assembly extending from and supporting the first sprocket. The carriage assembly has a stationary member and a moveable member moveable relative to the stationary member between an extended position and a retracted position. The lockout assembly is attached to the carriage assembly and includes a lockout fastener pivotably attached to one of the stationary member and moveable member and an engaging member attached to the other of the stationary member and moveable member.

8 Claims, 9 Drawing Sheets

(56) References Cited

U.S. PATENT DOCUMENTS

| | | |
|---|---|---|
| 6,625,969 B2 | 9/2003 | Glazik |
| 7,073,316 B2 | 7/2006 | Resing et al. |
| 7,373,767 B2 | 5/2008 | Calmer |
| 7,874,134 B1 | 1/2011 | Hoffman |
| 7,913,480 B2 | 3/2011 | Christensen et al. |
| 8,863,487 B2 * | 10/2014 | Calmer ................ A01D 45/021 56/106 |
| 8,888,625 B2 | 11/2014 | Lehman et al. |
| 2014/0260164 A1 | 9/2014 | Lohrentz et al. |

* cited by examiner

LOCKOUT FASTENER FOR A GATHERING CHAIN ASSEMBLY OF AN AGRICULTURAL HARVESTER ROW UNIT

BACKGROUND

The subject application relates generally to corn headers used with combine harvesters. In particular, the subject application relates to an improved corn header having a row unit with a lockout fastener that allows an operator to adjust or remove a gathering chain while maintaining the gathering chain tensioner system in a retracted state.

An agricultural combine is a machine used to harvest a variety of crops from a field. During a harvesting operation of, e.g., corn, a corn header at the front of the combine cuts ripened crop from the field. A feederhouse downstream the corn header transfers the crop material to the downstream processes of the combine. Threshing and separating assemblies within the combine remove grain from the crop material and transfers the grain to a grain tank for temporary holding. Crop material other than grain (MOG) exits from the rear of the combine.

Combines that harvest corn are provided with a corn header having row dividers for directing rows of corn stalks to row units that include ear separation chambers or stripping plates, and then to an auger for conveying the corn to the feederhouse of the combine. Conventional corn headers rely on the forward motion of the tapered row divider to lift and move crop plants into the row units, assisted by gathering chains that are integral to the row units and that move adjacent to the stripping plates. However, the gathering chains require periodic maintenance, which will necessitate the adjustment or complete removal of the gathering chain. Carrying out this procedure on a conventional corn header requires a lockout tool to maintain the gathering chain tensioner system in a retracted state, or else, a complete disassembly of the tensioner system. As such, this would leave an operator or maintenance worker with only one free hand to manipulate and remove the gathering chain, as the other hand is occupied keeping the lockout tool in position to maintain the tensioner system in the retracted state. Depending on the size and weight of the gathering chain, as well as that of the human operator and the force required to maintain the tensioner system in the retracted state, this procedure could prove unduly difficult for a single person to carry out. The difficulty of this procedure also poses risks of economic loss due to operator injury or lost productivity when a worker is required to reassemble a tensioner system for maintenance or breakdown issues.

Thus, there is a need for a lockout mechanism that addresses the foregoing deficiencies in conventional corn header systems. This need is satisfied by the subject application of a row unit having a lockout assembly for a gathering chain of an agricultural harvester.

BRIEF SUMMARY

In accordance with a preferred embodiment, the subject application provides a row unit for an agricultural harvester corn header that has a frame extending in forwardly fashion and a gathering chain assembly mounted to the frame. The gathering chain assembly supports an endless chain extending between first and second sprockets, and includes a carriage assembly having a stationary member and a moveable member moveable between an extended position and a retracted position. Attached to the carriage assembly is a lockout assembly having a lockout fastener and an engaging member. The lockout fastener is pivotably attached to one of the stationary member and moveable member, and the engaging member is attached to the other of the stationary member and moveable member. The lockout fastener engages the engaging member to maintain the moveable member in the retracted position, thus allowing adjustment or removal of the gathering chain.

In accordance with a second aspect, the subject application provides a lockout assembly for a row unit of an agricultural harvester header. The lockout assembly includes a lockout fastener having a main body portion and a proximal end. The main body portion has a substantially transversely extending retaining member and a distal face, while the proximal end extends from the main body portion for pivotably connecting to a carriage assembly of a row unit. The lockout assembly also includes an engaging member for attaching to the carriage assembly. The engaging member engages with the distal face or the retaining member.

In accordance with a third aspect, the present invention provides a lockout fastener for a row unit of an agricultural harvester header. The lockout fastener has a top portion and lateral side portions extending from the top portion. Each lateral side portion includes a mounting portion, an aperture and a substantially planar distal face. The mounting portion is for pivotably mounting to a carriage of the row unit and extends rearwardly beyond a rear end of the top portion. The aperture is for receiving a corresponding engaging member attached to the carriage. The distal face extends transversely to a longitudinal direction of the top portion and serves to engage a corresponding engaging member mounted on a carriage assembly of the row unit.

BRIEF DESCRIPTION OF THE SEVERAL VIEWS OF THE DRAWINGS

The foregoing summary, as well as the following detailed description of preferred embodiments of the subject application, will be better understood when read in conjunction with the appended drawings. For the purpose of illustrating the invention, there are shown in the drawings embodiments that are presently preferred. It should be understood, however, that the subject application is not limited to the precise arrangements and instrumentalities shown.

In the drawings.

DETAILED DESCRIPTION

Reference will now be made in detail to the preferred embodiments of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain" and "crop material" are used throughout the specification for convenience and it should be understood that these terms are not intended to be limiting. Thus, "grain" refers to that part of a crop that is harvested and separated from discardable portions of the crop material.

"About" as used herein when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

Figure 1:
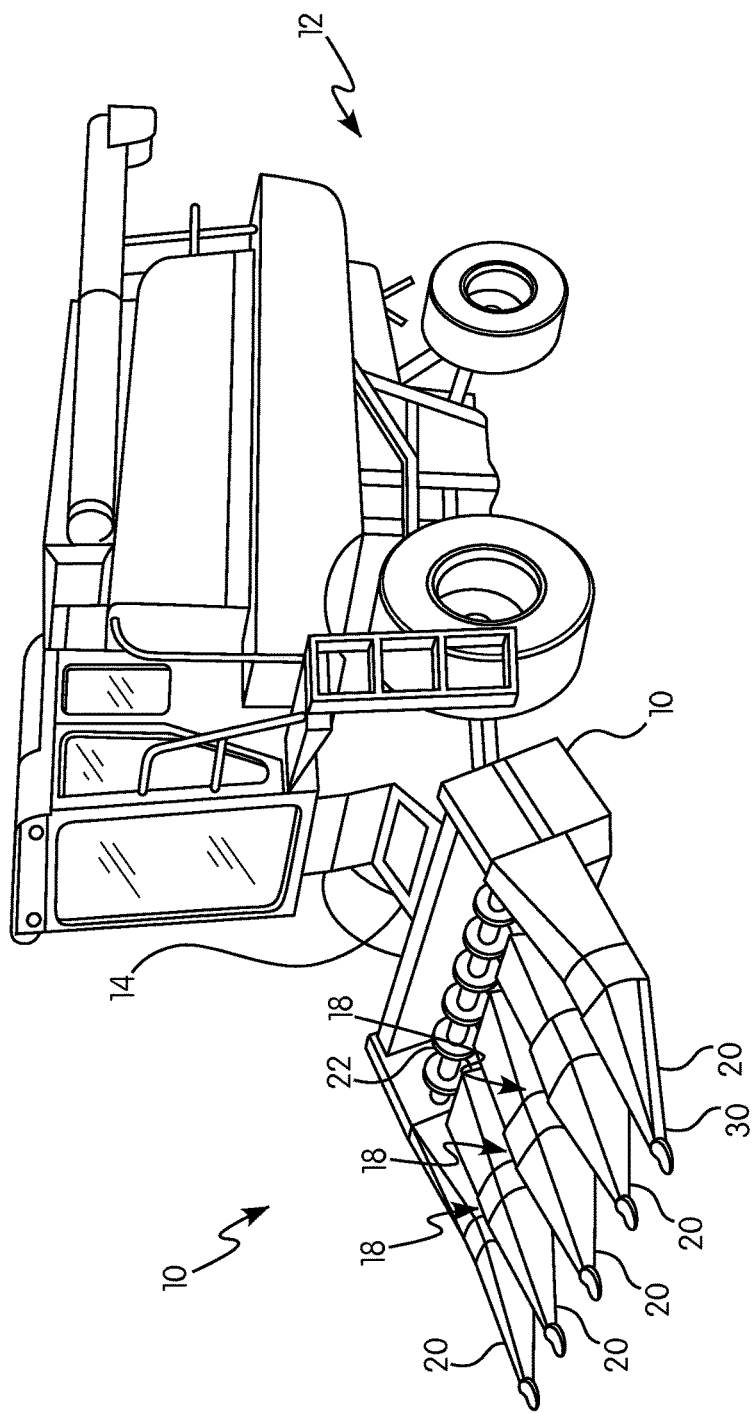
FIG. 1 is a perspective view of an agricultural combine having a header according to a preferred embodiment of the present invention.
Figure 2:
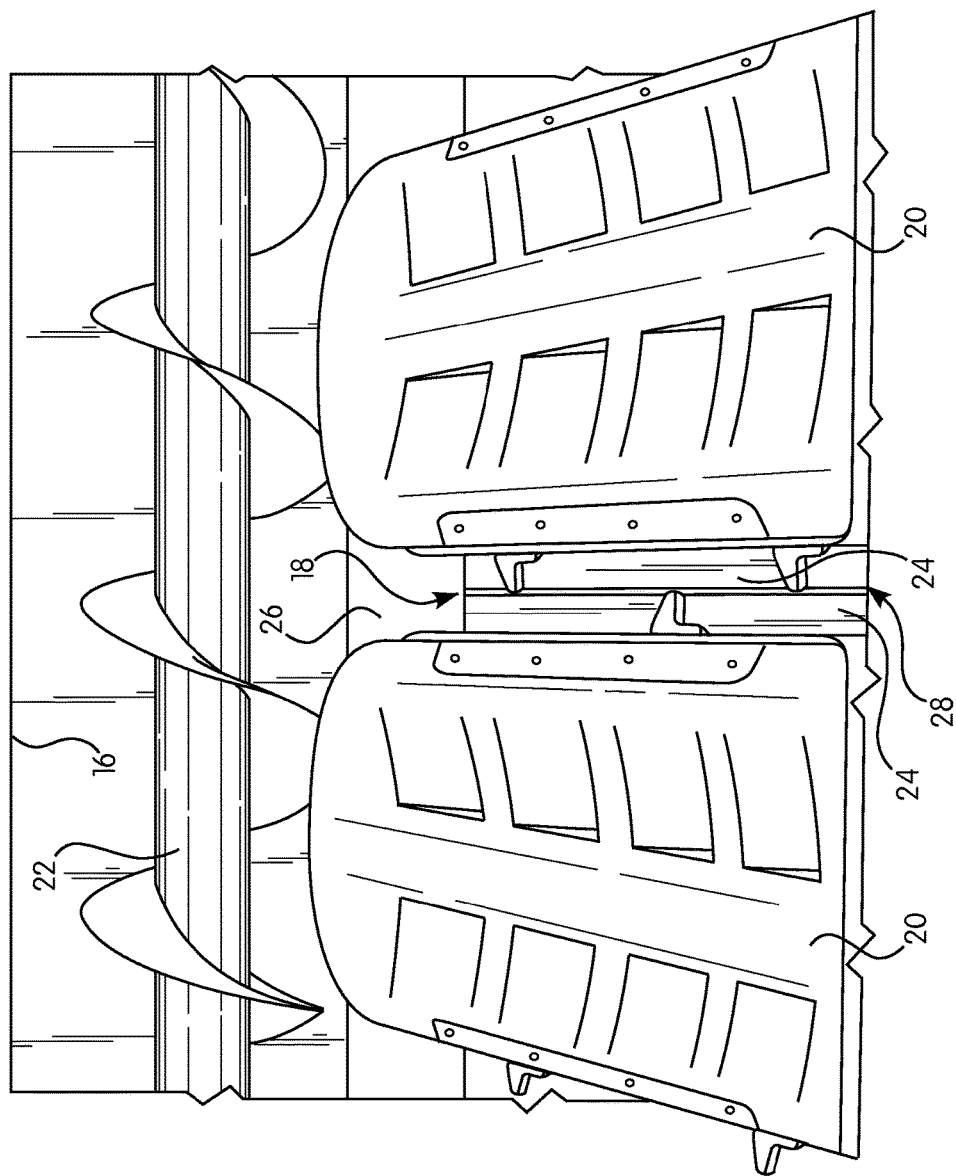
FIG. 2 is an enlarged partial perspective view of a row unit and two dividers of the header of FIG. 1.
Figure 3:
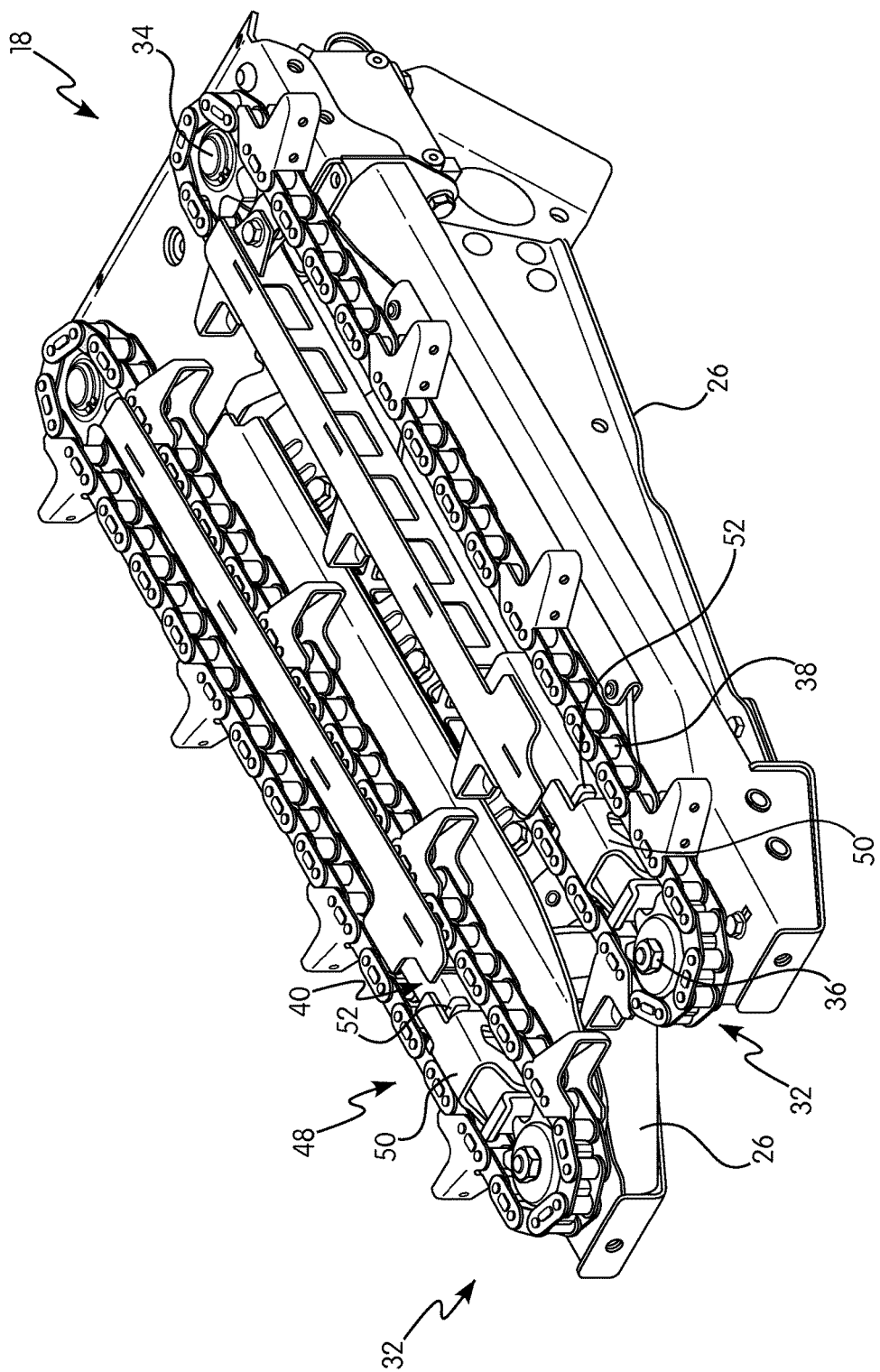
FIG. 3 is a perspective view of a row unit of the header of FIG. 1 with a carriage assembly of the row unit in an extended position.

Referring now to the drawings, wherein preferred embodiments of the subject application are shown, FIGS. 1 and 2 illustrate a corn header 10 of the present embodiment as applied to an agricultural combine or combine harvester 12. The corn header 10 is shown operatively connected to the combine harvester 12 for harvesting corn and feeding the corn to a feederhouse 14.

The corn header 10 includes a header frame 16 for mounting to a forward end of the combine harvester 12, a plurality of row units 18 extending forward from the header frame 16 and a plurality of row dividers 20. Each row divider 20 is connected to and extends forward of at least one row unit 18.

Such feederhouses, row units, row dividers, and harvesting operations of the combine harvester are known in the art and a further detailed description of their structure, function and operation is not necessary for a complete understanding of the present invention. However, typical corn headers applicable to the present invention are disclosed in U.S. Pat. Nos. 3,808,783 and 3,759,021, the entire disclosures of which are incorporated by reference herein for all purposes. A variety of row dividers and row units also applicable to the present invention are disclosed in U.S. Pat. Nos. 5,195,309; 6,625,969; 7,073,316; 7,913,480; 7,874,134 and 7,373,767 the entire disclosures of which are incorporated by reference herein for all purposes.

The corn header also includes a conveyor 22. The conveyor 22 conveys grain separated from the stalk by the row units 18 to the feederhouse 14 once the grain is received within a channel of the header below the conveyor 22. The conveyor 22 is connected to the header frame 16 about its side walls and is situated within the channel extending between the side walls of the header frame 16. As such, grain received within the channel is conveyed towards the feederhouse 14 by the conveyor 22. The conveyor 22 is positioned in front or above a combine feeding location and rearward of the row units 18 and dividers 20.

Each of the plurality of row units 18 is attached to the header frame 16 and extends in a forward direction from the header frame 16 and away from the combine harvester 12. Each row unit 18 includes a pair of deck plates (also commonly known as stripping plates) 24 mounted to a frame 26 of the row unit. In operation, crop material is stripped from the stalks as they are pulled within the row unit 18 and enter a gap 28 formed by the stripping plates 24. The stripped grain is then conveyed to the conveyor 22 owing to the flow of crop material in a rearward direction during harvesting operation. That is, the subsequent flow of crop material entering the row units 18 pushes/pulls the harvested crop material rearward towards the conveyor 22.

The plurality of dividers 20 extends forward from the header frame 16. The row dividers 20 extend forwardly from the header frame 16 and are connected to the plurality of row units 18 for directing, e.g., a row of corn stalks towards the gap 28 of the row unit 18. The row dividers 20 include a generally conical nose 30. Such noses 30 of the row dividers 20 are known in the art and a further detailed description of their structure, function and operation is not necessary for a complete understanding of the present invention.

Referring to FIGS. 3-8, the row unit 18 in accordance with a preferred embodiment is shown in detail and includes two frame sections 26 and two gathering chain assemblies 32 each mounted to the respective frame sections 26. Each gathering chain assembly 32 includes first and second sprockets 34, 36 with an endless chain 38 extending between them. The endless chain is also known in the art as a gathering chain, which can include a plurality of paddles.

Figure 4:
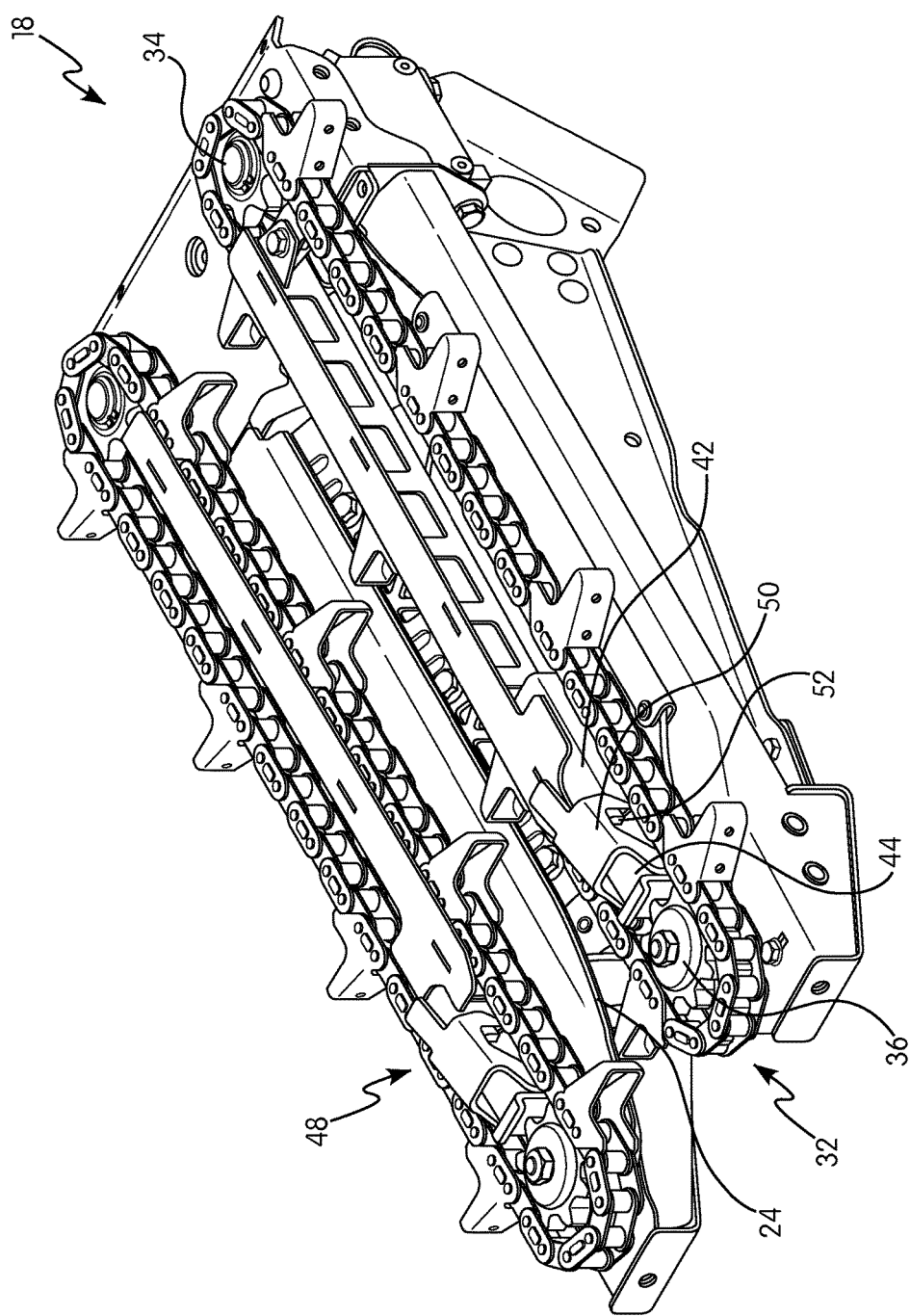
FIG. 4 is a perspective view of the row unit of FIG. 3 with the carriage assembly in a retracted position.
Figure 5:
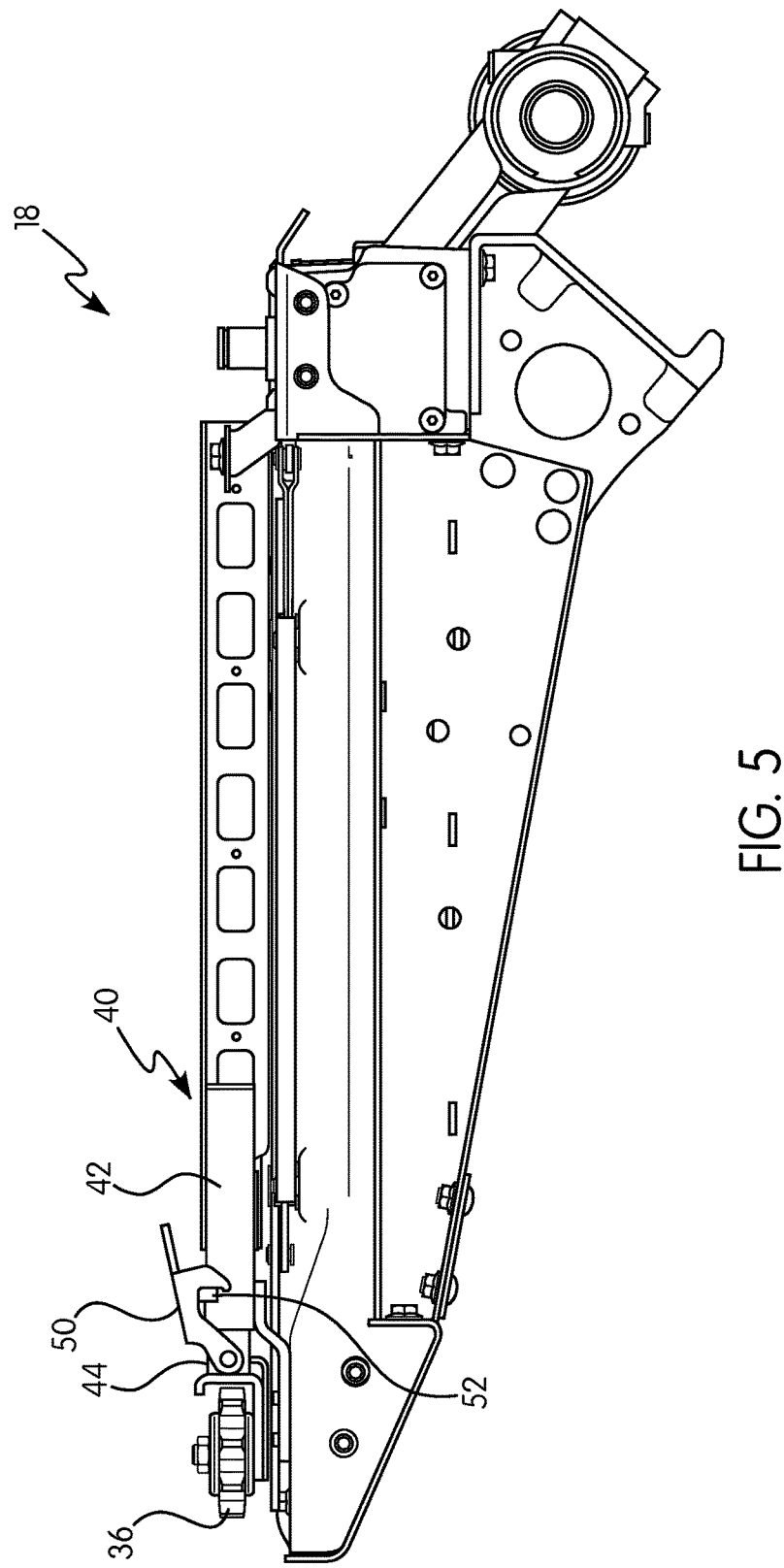
FIG. 5 is a side elevation view of FIG. 4 with various components omitted for purposes of illustration.
Figure 6:
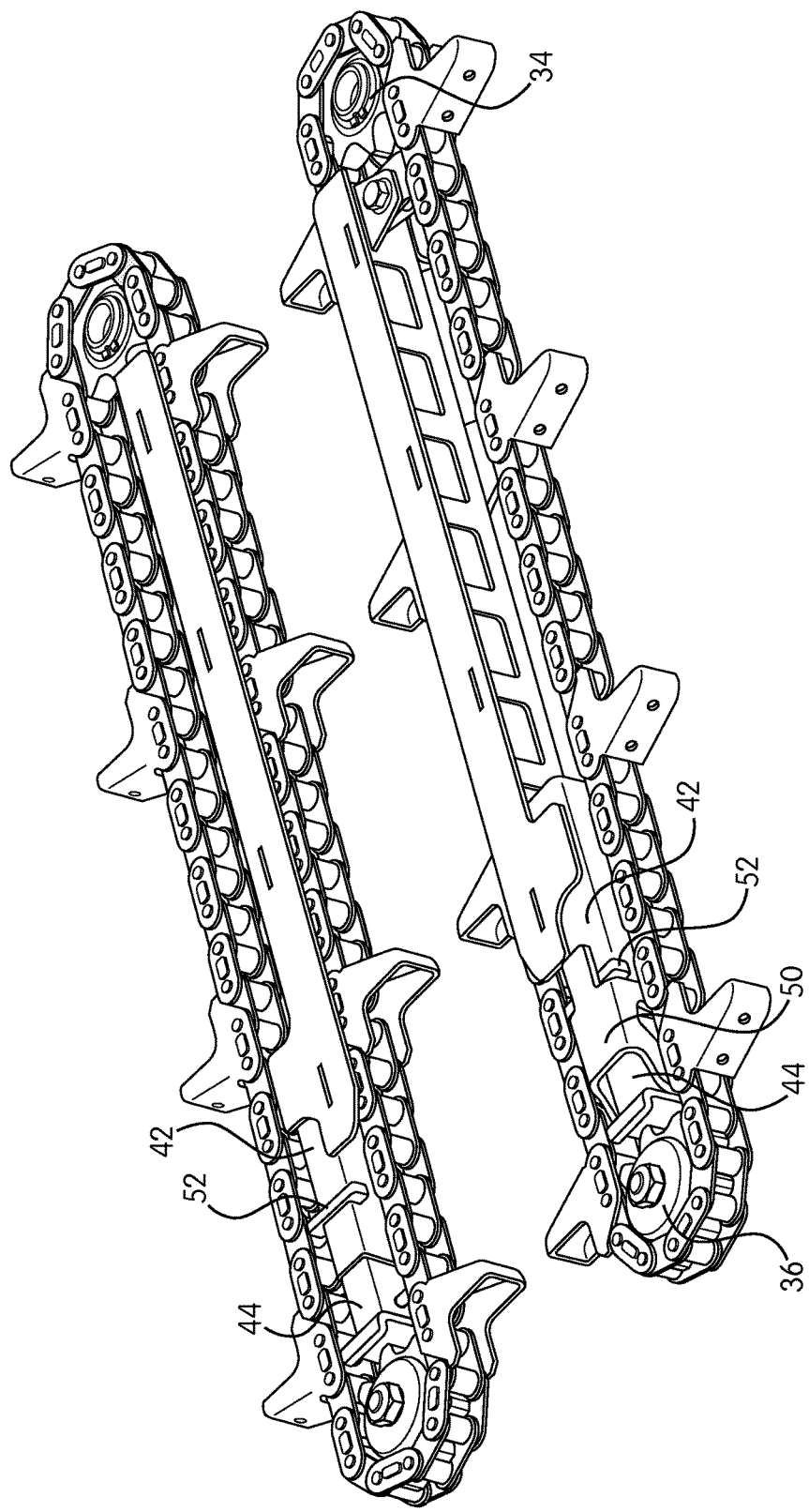
FIG. 6 is a perspective view of a pair of gathering chain assemblies of the row unit of FIG. 3 with various components omitted for purposes of illustration.

A carriage assembly 40 is also included in each gathering chain assembly 32. Each carriage assembly 40 has a stationary member 42 and a movable member 44, as best shown in FIG. 6. The movable member 44 is movable relative to the stationary member 42 between an extended position (FIG. 6) and a retracted position (FIG. 4). The movable member 44 is preferably configured to slidably move inwardly and outwardly of an interior cavity of the stationary member 42 so as to form a telescoping assembly.

Figure 7:
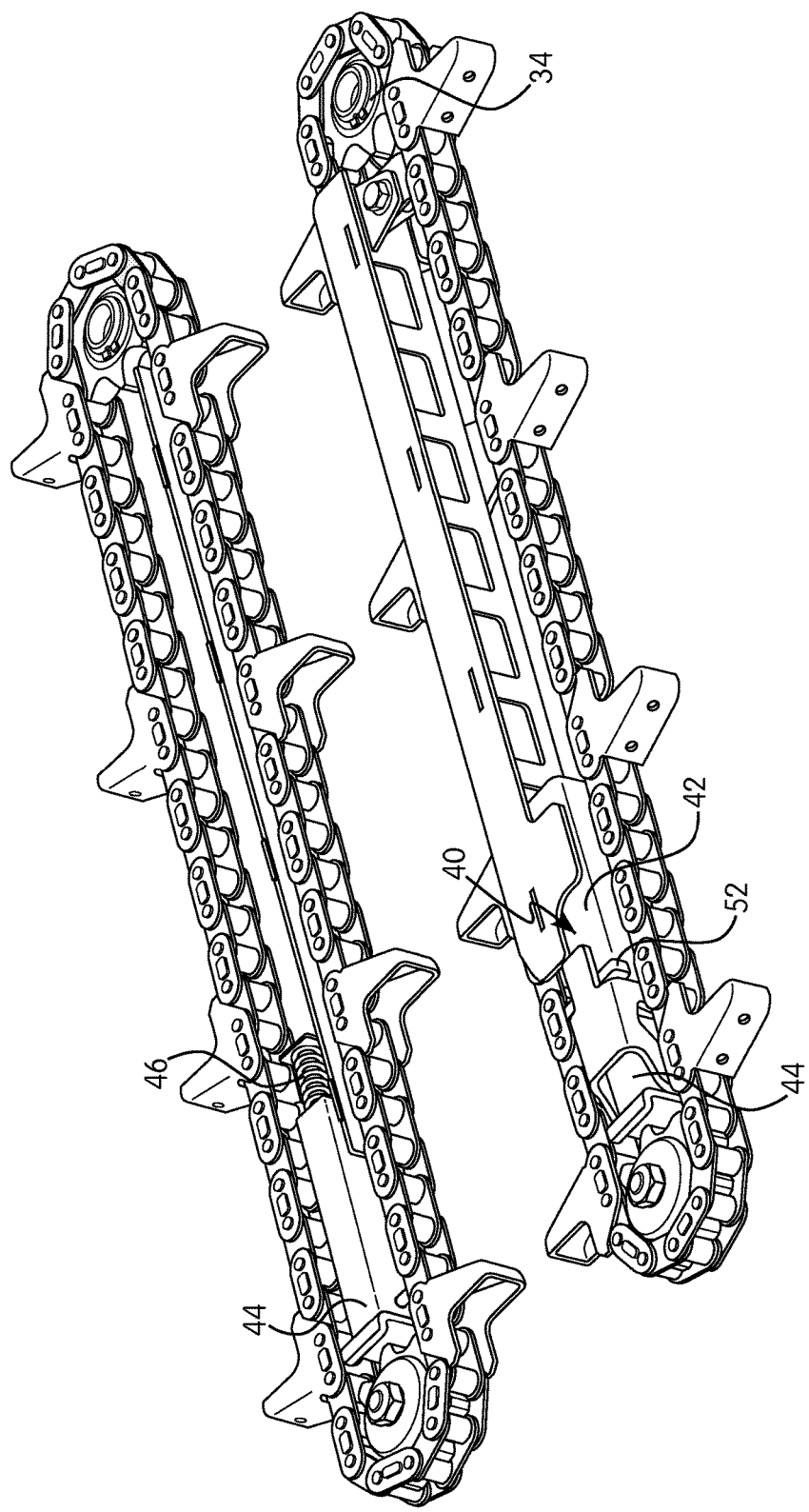
FIG. 7 is a perspective view of the pair of gathering chain assemblies of FIG. 6 with various components omitted for purposes of illustration.

Referring to FIG. 7, a biasing member 46 is aligned with and integral to the carriage assembly 40. One end of the biasing member 46 is engageable with the stationary member 42 and the other end is engageable with the movable member 44. The biasing member 46 urges the movable member 44 towards the extended position to maintain the endless chain 38 in a proper state of tension during a harvesting operation. The carriage assembly 40 is in the extended position during normal harvesting operations. The movable member 44 is moved to the retracted position when the endless chain 38 must be put in a slackened condition in order to be adjusted or removed.

The biasing member 46 can be, for example, a compression spring, a constant force spring, an elastomer, an actuator and the like.

The row unit 18 of the subject application also includes a lockout assembly 48 attached to the carriage assembly 40. The lockout assembly 48 enables the retention of the carriage assembly 40 in the retracted state when the need arises to adjust or remove the endless chain 38. The lockout assembly includes a lockout fastener 50 pivotably attached to one of the stationary member 42 and moveable member 44, and an engaging member 52 attached to the other of the stationary member 42 and moveable member 44. Preferably the lockout fastener is attached to the moveable member and the engaging member is attached to the stationary member.

The lockout fastener 50 engages the engaging member 52 when the moveable member 44 is in the retracted position, thus retaining the movable member 44 in the retracted state. The lockout fastener is also configured to engage the engaging member when the carriage assembly is in the extended position, as further discussed below.

The engaging member 52 is a protuberance engageable with the lockout fastener to maintain the movable member 44 in the retracted position against the force supplied by the biasing member. In particular, the protuberance is engageable with the at least one hook of the lockout fastener. Preferably, the engaging member 52 is configured to extend laterally across the stationary member 42. More preferably, the engaging member 52 is configured as a linear or elongated bracket or elongated member extending laterally across one of the moveable member 44 and the stationary member 42 with ends that extend laterally outwardly from lateral sides of the stationary member 42 or moveable member 44. Alternatively, the engaging member 52 can be configured to have any shape capable of allowing the lockout fastener to engage with it e.g., in a hook-like fashion.

Figure 8:
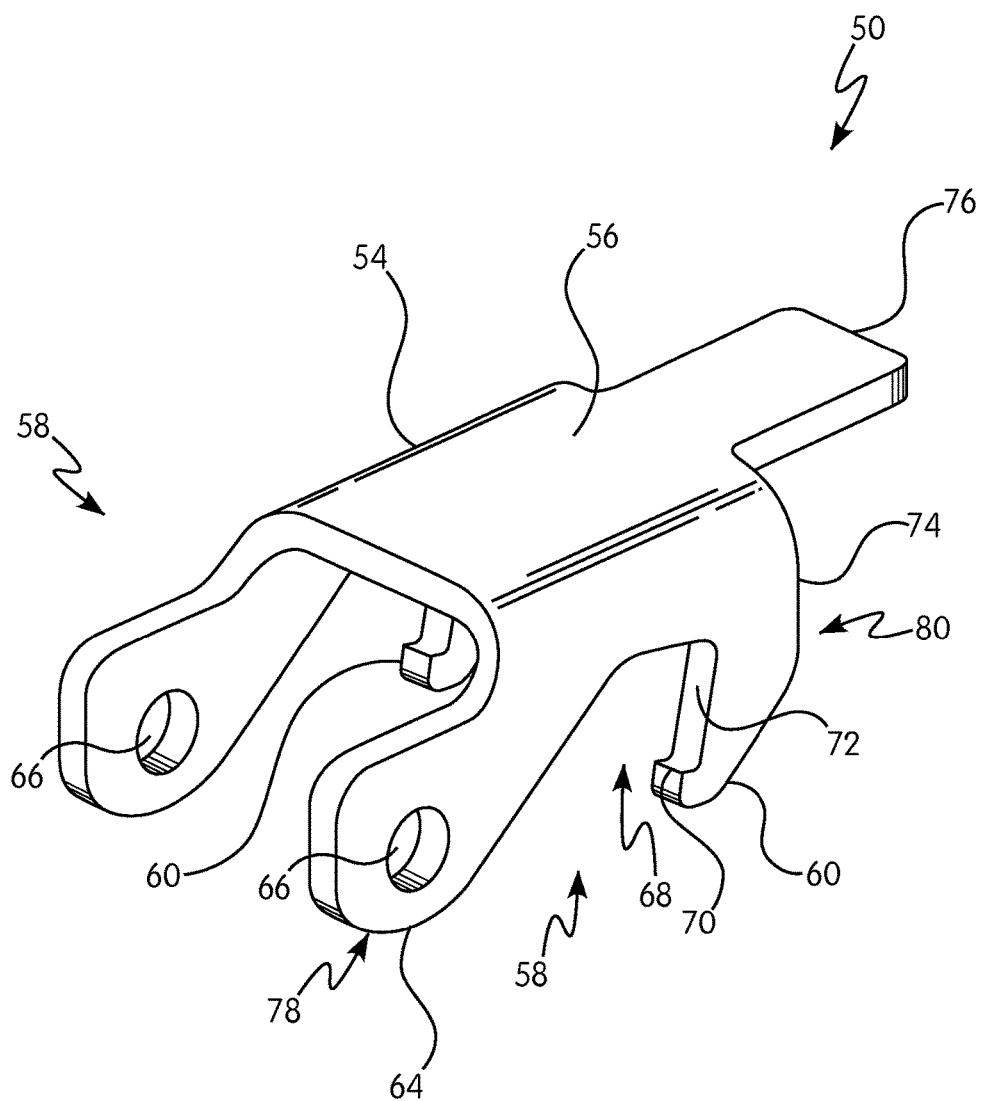
FIG. 8 is an enlarged rear perspective view of a lockout fastener of the row unit of FIG. 3.
Figure 9:
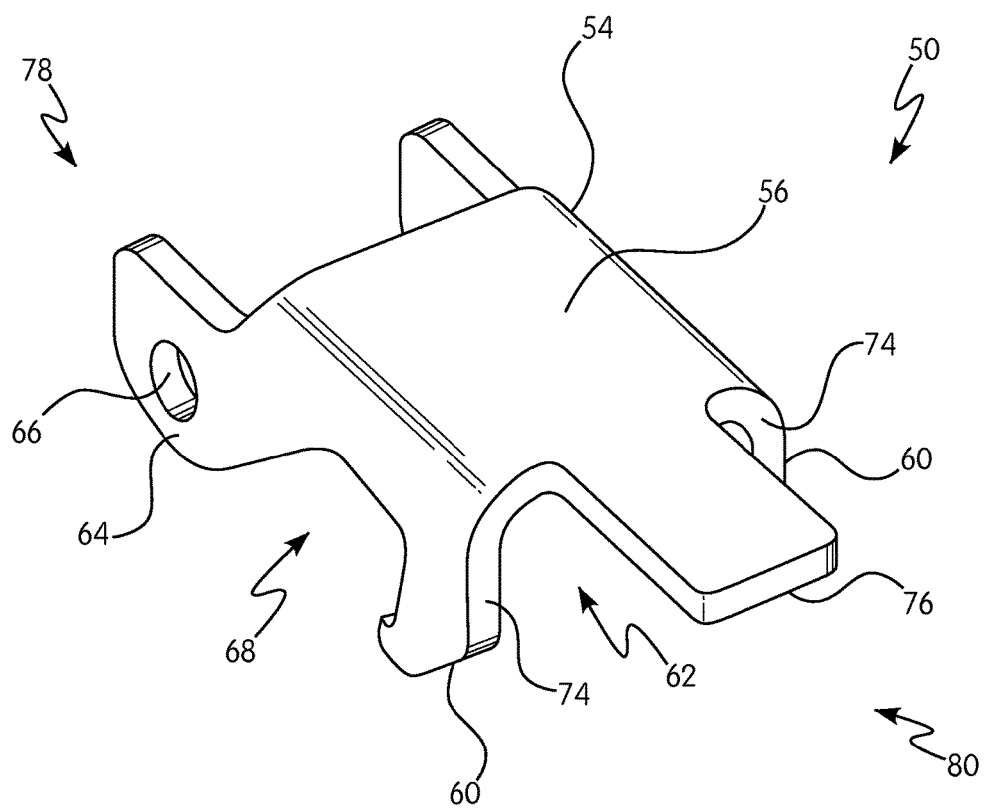
FIG. 9 is an enlarged front perspective view of the lockout fastener of FIG. 8.

The lockout fastener 50 is configured as best shown in FIGS. 8 and 9. The lockout fastener includes a main body portion 54 having a top portion 56 and lateral side portions 58 extending from the top portion. Each lateral side portion 58 includes a hook or retaining member 60 for releasably engaging the engaging member 52. Each hook or retaining member 60 extends downwardly from a respective lateral side of the top portion. In other words, the lockout fastener includes at least one hook engageable with the engaging member. So configured, the lockout fastener forms a gap 62 between the pair of spaced apart hook or retaining members for receiving the carriage assembly 40. Specifically, the gap 62 is sized and shaped to receive a width of the moving member 44 and the stationary member 42.

In accordance with an aspect, the lateral side portions depending from the top portion for a substantially U-shaped cross-section along the longitudinal direction.

The lateral side portions 58 also include a mounting portion 64 for pivotably mounting to the carriage assembly of the row unit. The mounting portion 64 extends rearwardly beyond a rear or proximal end of the top portion. Preferably, the mounting portion extends substantially transverse the top portion. Additionally, the mounting portion can include an aperture 66 for receiving a pivot pin (not shown) for pivotably mounting the lockout fastener to the carriage assembly 40. Preferably, the mounting portion is pivotably mounted to the movable member 44 about a position along the longitudinal direction of the moveable member such that a distal face of the retaining member is adjacent the engaging member, as best shown in FIG. 6, and further discussed below.

Each lateral side portion 58 also includes an aperture 68 for receiving a corresponding engaging member i.e., engaging member 52, attached to the carriage assembly. The aperture 68 is bounded by the mounting portion 64, the top portion 56 and the hook or retaining member 60.

Each hook or retaining member 60 preferably extends substantially transverse from the top portion 56 and includes a lip or flange portion 70 extending transverse from a longitudinal direction of the hook or retaining member. Specifically, the lip 70 extends rearwardly from the hook about a bottom end of the hook to facilitate engagement with the engaging member, as best shown in FIG. 4.

The retaining member can be configured as a hook having an inner surface 72 and an outer surface or distal face 74 i.e., a distally facing surface, that is substantially planar, but can alternatively be curved or any other shape suitable for its intended purpose. The inner surface 72 is engageable with the engaging member 52. The distal face 74 is preferably substantially transverse to a longitudinal direction of the top portion 56 or a tongue 76 of the lockout fastener, as further discussed below. The distal face 74 is positioned to be immediately adjacent the engaging member 52 so as to be engageable with the engaging member 52 in the event forces applied to the row unit move the moveable member in a direction opposite that supplied by the biasing member. This in turn locks the carriage assembly 40 in the proper position, limiting its stroke, so as to maintain proper tension on the gathering chain.

The lockout fastener 50 also includes a tongue 76. The tongue 76 extends from the main body portion further distally that the hook 60 and can serve as a handle for disengaging the lockout fastener from the engaging member when the carriage assembly is in the retracted position, as best shown in FIG. 4. The tongue is preferably configured to extend substantially transverse to the distal face and to rest on the engaging member 52 when the carriage assembly is in the extended position. In other words, the tongue is engageable with the engaging member when the carriage assembly is in the extended position and extends from the top portion beyond the distal face of the lateral side portions.

In sum, the subject application provides a lockout assembly 48 of a row unit 18 for a header 10 of an agricultural harvester 12 that includes a lockout fastener 50 and an engaging member 52 which, when engaged with one another maintain a gathering chain assembly in a retracted state or facilitates maintaining the gathering chain assembly in the extended state. The lockout fastener 50 includes a proximal end 78 pivotably attached to the carriage assembly 40 and a distal end 80 opposite the proximal end. The distal end 80 includes the distal face 74 which is designed to be positioned adjacent the engaging member 52 when the lockout fastener is assembled to the carriage assembly 40 and the carriage assembly is positioned in the extended position.

It will be appreciated by those skilled in the art that changes could be made to the embodiments described above without departing from the broad inventive concept thereof. For example, alternative embodiments of the hooks of lockout fastener and designs for the engaging member can be used to produce the same results from the same principle as the hook that engages a protuberance or bracket of the present embodiments. It is to be understood, therefore, that the subject application is not limited to the particular embodiment disclosed, but it is intended to cover modifications within the spirit and scope of the subject application as defined by the appended claims.

We claim:

1. A row unit of a header for an agricultural harvester comprising:
   a frame;
   a gathering chain assembly mounted to the frame, the gathering chain assembly including:
   first and second sprockets,
   an endless chain extending between the first and second sprockets,
   a carriage assembly extending from and supporting the first sprocket, the carriage assembly having:
   a stationary member, and
   a moveable member moveable relative to the stationary member between an extended position and a retracted position; and a lockout assembly attached to the carriage assembly, the lockout assembly including:
a lockout fastener pivotably attached to one of the stationary member and moveable member, and
an engaging member attached to the other of the stationary member and moveable member, wherein the lockout fastener engages the engaging member when the moveable member is in the retracted position.

2. The row unit of claim 1, wherein the lockout fastener includes at least one hook, and the engaging member comprises a protuberance engageable with the at least one hook.

3. The row unit of claim 1, wherein the engaging member comprises a bracket extending laterally across one of the moveable member and stationary member.

4. The row unit of claim 1, wherein the engaging member extends laterally from one of the moveable member and stationary member.

5. The row unit of claim 1, wherein the stationary member and moveable member comprise a telescoping assembly.

6. The row unit of claim 1, wherein the lockout fastener includes a tongue engageable with the engaging member when the carriage assembly is in the extended position.

7. The row unit of claim 1, wherein the lockout fastener includes a proximal end pivotably attached to the carriage assembly and a distal end opposite the proximal end, and wherein the distal end includes a distal face adjacent the engaging member when the carriage assembly is in the extended position.

8. The row unit of claim 1, wherein the lockout fastener includes a pair of spaced apart retaining members forming a gap therebetween for receiving the carriage assembly therein.

* * * * *